United States Patent
Nagano

(10) Patent No.: US 12,437,648 B2
(45) Date of Patent: Oct. 7, 2025

(54) IN-VEHICLE INFORMATION PROCESSING DEVICE

(71) Applicant: Faurecia Clarion Electronics Co., Ltd., Saitama (JP)

(72) Inventor: Yuki Nagano, Saitama (JP)

(73) Assignee: FAURECIA CLARION ELECTRONICS CO., LTD., Saitama (JP)

( * ) Notice: Subject to any disclaimer, the term of this patent is extended or adjusted under 35 U.S.C. 154(b) by 141 days.

(21) Appl. No.: 18/519,678

(22) Filed: Nov. 27, 2023

(65) Prior Publication Data

US 2024/0177602 A1    May 30, 2024

(30) Foreign Application Priority Data

Nov. 30, 2022 (JP) .................. 2022-192030

(51) Int. Cl.
| G08G 1/16 | (2006.01) |
| G08G 1/0967 | (2006.01) |
| B60R 1/26 | (2022.01) |

(52) U.S. Cl.
CPC ........... *G08G 1/167* (2013.01); *G08G 1/0967* (2013.01); *G08G 1/16* (2013.01); *B60R 1/26* (2022.01); *B60R 2300/305* (2013.01)

(58) Field of Classification Search
CPC .......... G08G 1/00; G08G 1/09; G08G 1/0967; G08G 1/16; G08G 1/166; G08G 1/167; G05B 15/00; G05B 15/02; G05D 1/222; G05D 1/227; G06F 8/65; B60R 1/26; B60W 10/00; B60W 10/04; B60W 40/02
See application file for complete search history.

(56) References Cited

U.S. PATENT DOCUMENTS

| 2021/0116875 A1* | 4/2021 | Iwanami ................ F25D 23/02 |
| 2022/0318960 A1* | 10/2022 | Tsuchiya ................ G06T 5/80 |
| 2023/0418586 A1* | 12/2023 | Tian ....................... G06F 8/65 |

FOREIGN PATENT DOCUMENTS

JP    2015011457 A    1/2015

* cited by examiner

*Primary Examiner* — Van T Trieu
(74) *Attorney, Agent, or Firm* — Reising Ethington P.C.

(57) ABSTRACT

An in-vehicle information processing device for providing information regarding traffic rules to help suppress traffic rule violation. The device may include: a traffic rule information acquisition unit that acquires information regarding a traffic rule for a road on which a vehicle travels; a vehicle information acquisition unit that acquires information regarding an operation of turning the vehicle; a determination unit that determines whether the operation violates the traffic rule; a selection unit that selects an electronic mirror in a direction corresponding to the operation; and a display control unit that controls the display of information on the selected electronic mirror for which the operation violates the traffic rule.

8 Claims, 5 Drawing Sheets

FIG. 5

| Traffic rule | Operation | Warning content |
|---|---|---|
| Overtaking prohibition section | Turn signal ON | Overtaking prohibition section |
| | Steering operation (in lane) | |
| Lane change prohibition section | Turn signal ON | Lane change prohibition section |
| | Steering operation (in lane) | |
| Entry prohibition | Turn signal ON | Entry prohibition |
| | Steering operation | |
| Right turn prohibition, left turn prohibition | Turn signal ON | Right turn prohibition, left turn prohibition |
| | Steering operation | |
| U-turn prohibition | Turn signal ON | U-turn prohibition |
| | Steering operation | |
| Overspeed | Near speed upper limit + turn signal ON | Speed upper limit (legal speed, speed limit) |
| Parking and stopping prohibition | Sidewalk side turn signal ON | Parking and stopping prohibition |

IN-VEHICLE INFORMATION PROCESSING DEVICE

CROSS REFERENCE TO RELATED APPLICATION

This patent application claims the benefit and priority of Japanese Patent Application No. 2022-192030, filed on Nov. 30, 2022, the disclosure of which is incorporated by reference herein in its entirety as part of the present application.

FIELD

The present invention relates to an in-vehicle information processing device.

BACKGROUND

A known electronic mirror system provides a function corresponding to a door mirror or a fender mirror by photographing the surroundings of a vehicle with a camera and displaying an image obtained as a photographing result onto a display in the vehicle.

For example, JP 2015-011457 A discloses "To provide a technique capable of determining whether or not a driver appropriately performs safety confirmation in accordance with a surrounding circumstance" and "A front camera 4 and a radar device 8 acquire surrounding circumstance information indicating a surrounding circumstance of an own vehicle. Then, a vehicle information provision device: determines existence of a confirmation object (a traffic sign, an electric bulletin board, an obstacle on a road, a left-turn lane, a right-turn lane, a pedestrian crossing, a traffic light or an approaching vehicle from behind) which needs to be confirmed by a driver of the own vehicle on the basis of the surrounding circumstance information acquired by the front camera 4 and the radar device 8; and displays a driver confirmation image, to the driver, requiring the driver to confirm the confirmation object to the driver when determining the existence of the confirmation object. Also, the vehicle information provision device detects a direction of driver's eyes; and determines whether or not the driver moves eyes thereof toward a position where the driver confirmation image is displayed, on the basis of a detection result of the direction of the driver's eyes."

For example, in JP 2015-011457 A, the existence of a confirmation object (a traffic sign, an electric bulletin board, an obstacle on a road, a left-turn lane, a right-turn lane, a pedestrian crossing, a traffic light or an approaching vehicle from behind) needs to be confirmed by a driver of the own vehicle. When the existence of the confirmation object is determined, a driver confirmation image requiring the driver to confirm the confirmation object is displayed to the driver. However, it is not efficient to intentionally guide the line of sight of the driver to the driver confirmation image in order to notify the driver of traffic rules.

An object of the present application is to efficiently provide information regarding traffic rules and suppress traffic rule violation.

SUMMARY

In order to achieve the above object, one of the in-vehicle information processing devices of the present application includes: a traffic rule information acquisition unit that acquires information regarding a traffic rule of a road on which a vehicle travels; a vehicle information acquisition unit that acquires information regarding an operation of turning the vehicle; a determination unit that determines whether the operation violates the traffic rule; a selection unit that selects an electronic mirror in a direction corresponding to the operation from a plurality of electronic mirrors; and a display control unit that performs control to display the information regarding the traffic rule on the electronic mirror, when the operation violates the traffic rule, the display control unit performs control to display the information regarding the traffic rule on the selected electronic mirror.

According to the present application, the in-vehicle information processing device can efficiently provide information regarding traffic rules and suppress traffic rule violation. The following description of embodiments will elucidate the problems, configurations, and effects other than those described above.

DRAWINGS

FIG. 5 is an example of providing the driver with information on a traffic rule.

EMBODIMENTS

Embodiments will hereinafter be described with reference to the drawings.

Embodiment 1

Figure 1:
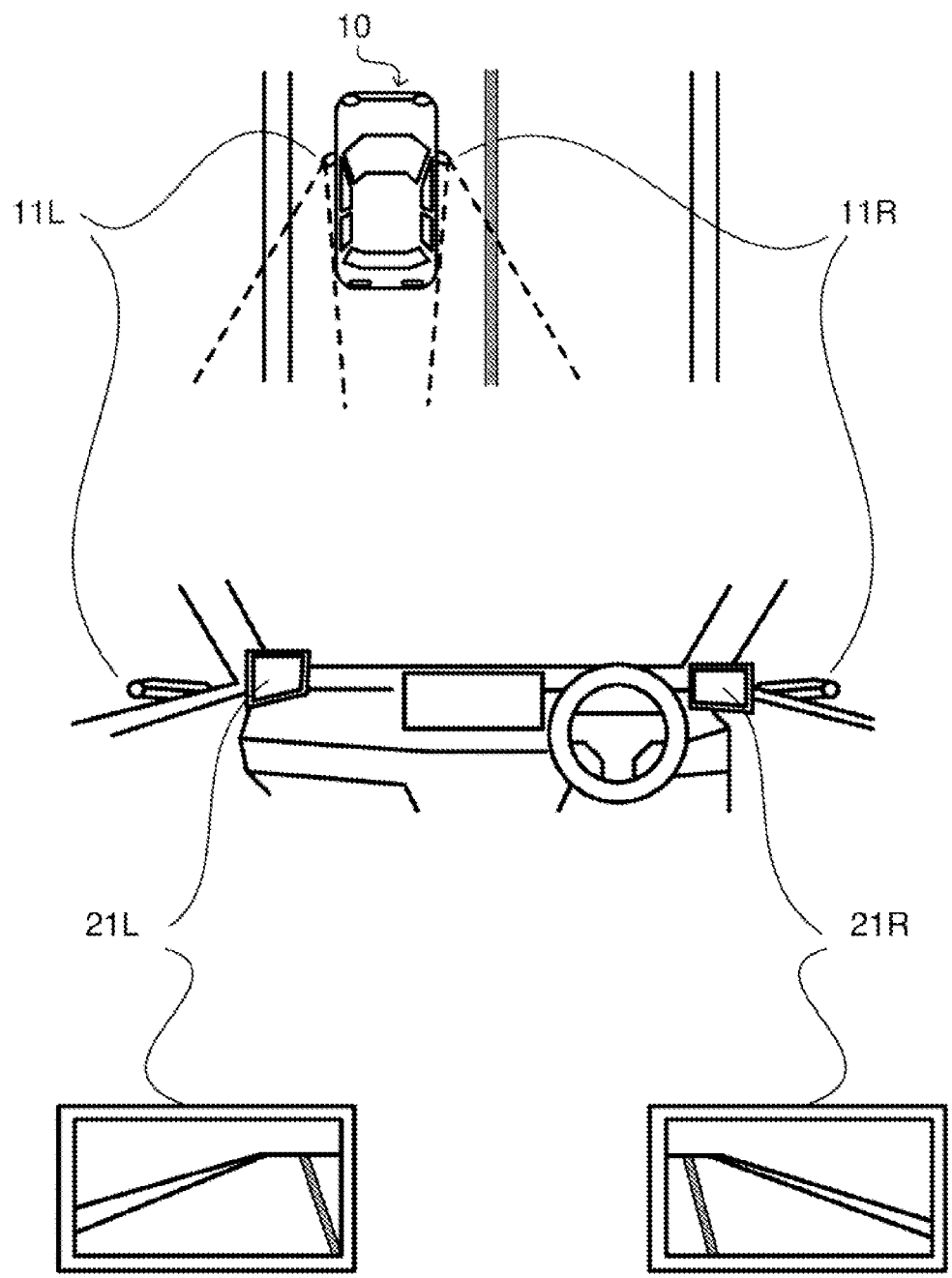
FIG. 1 is a view illustrating an electronic mirror system.

FIG. 1 is a view illustrating an electronic mirror system. A vehicle 10 has a driver's seat on the right side and a passenger's seat on the left side. The vehicle 10 has a camera 11R on the right side of the vehicle and a camera 11L on the left side of the vehicle. The camera 11R photographs a right rear of the vehicle 10. The camera 11L photographs a left rear of the vehicle 10.

An electronic mirror 21R and an electronic mirror 21L are disposed inside the vehicle 10. The electronic mirror 21R is a display that provides a function corresponding to a door mirror that visually recognizes the right rear by displaying an image photographed by the camera 11R. The electronic mirror 21L is a display that provides a function corresponding to a door mirror that visually recognizes the left rear by displaying an image photographed by the camera 11L. The electronic mirror 21R is disposed in the vicinity of a right front pillar, for example. The electronic mirror 21L is disposed in the vicinity of a left front pillar, for example. Note that the electronic mirrors 21R and 21L may be disposed outside the vehicle 10. In this case, the electronic mirrors 21R and 21L are optimally disposed at the positions of known side mirrors.

Figure 2:
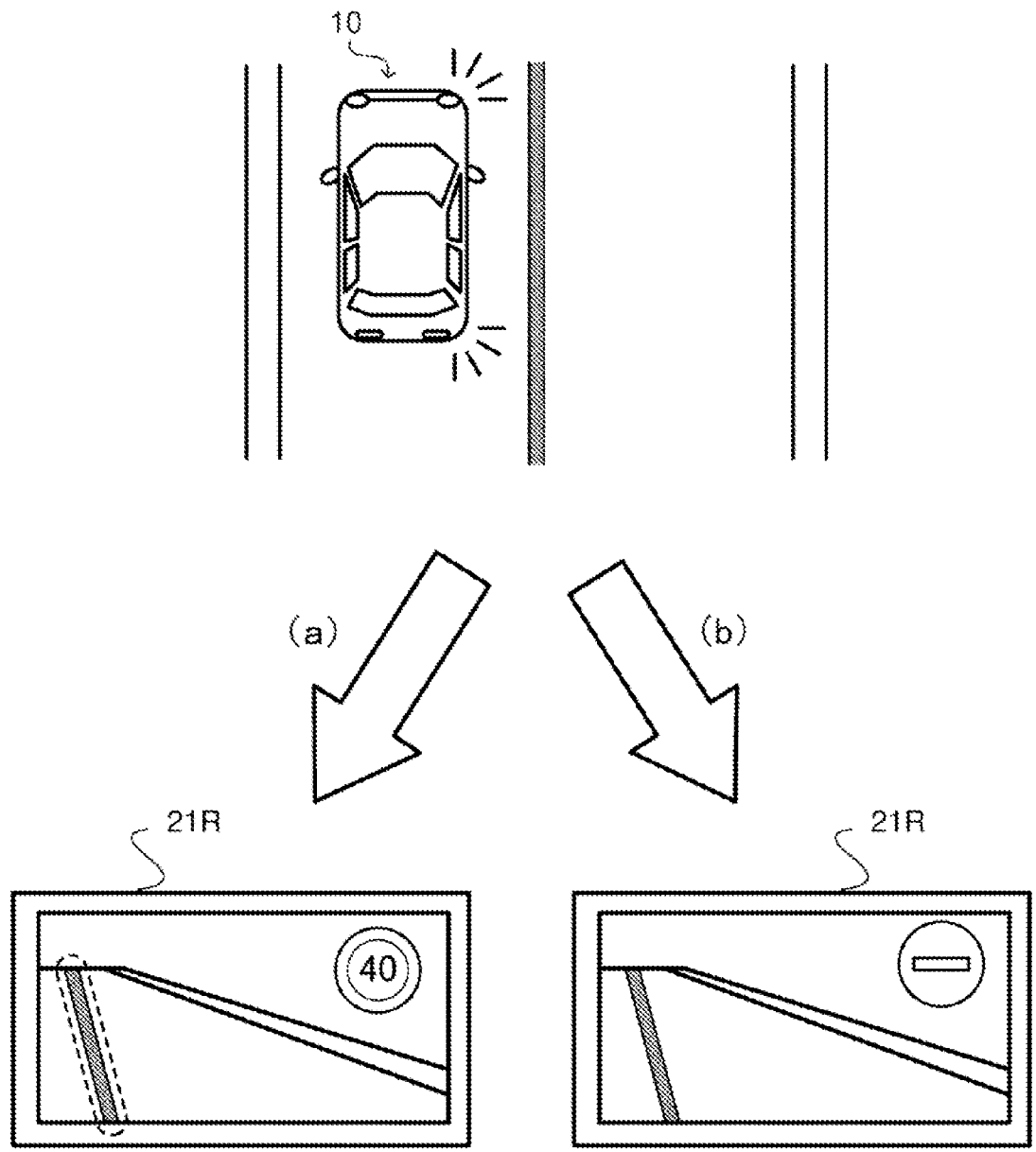
FIG. 2 is a view describing an example of providing a driver with information on a traffic rule.

FIG. 2 is a view describing an example of providing the driver with information on a traffic rule. When the driver of the vehicle 10 performs an operation of blinking a right turn signal lamp, an in-vehicle information processing device 20 mounted on the vehicle 10 provides information on the traffic rules according to the situation.

In a case of (a) of FIG. 2, the in-vehicle information processing device 20 makes the following determination.

"The vehicle 10 possibly travels beyond the line indicating the deviation prohibition in order to overtake another vehicle." "The vehicle 10 possibly accelerates to overtake another vehicle and possibly violates the speed regulation." The in-vehicle information processing device 20 highlights a line on the electronic mirror 21R based on the determination result, and adds a display of a sign indicating the speed regulation. This is because it is highly possibly that the driver sees the electronic mirror 21R on the right side to check the right side before the vehicle 10 deviates the line indicating the deviation prohibition present on the right side.

In a case of (b) of FIG. 2, the in-vehicle information processing device 20 makes the following determination. "The vehicle 10 possibly turns right and enters a road where entry is prohibited." The in-vehicle information processing device 20 adds a display of a sign indicating entry prohibition to the electronic mirror 21R based on the determination result. This is because it is highly possibly that the driver sees the electronic mirror 21R on the right side to check the right rear before the vehicle 10 turns right and enters the road where entry is prohibited.

Figure 3:
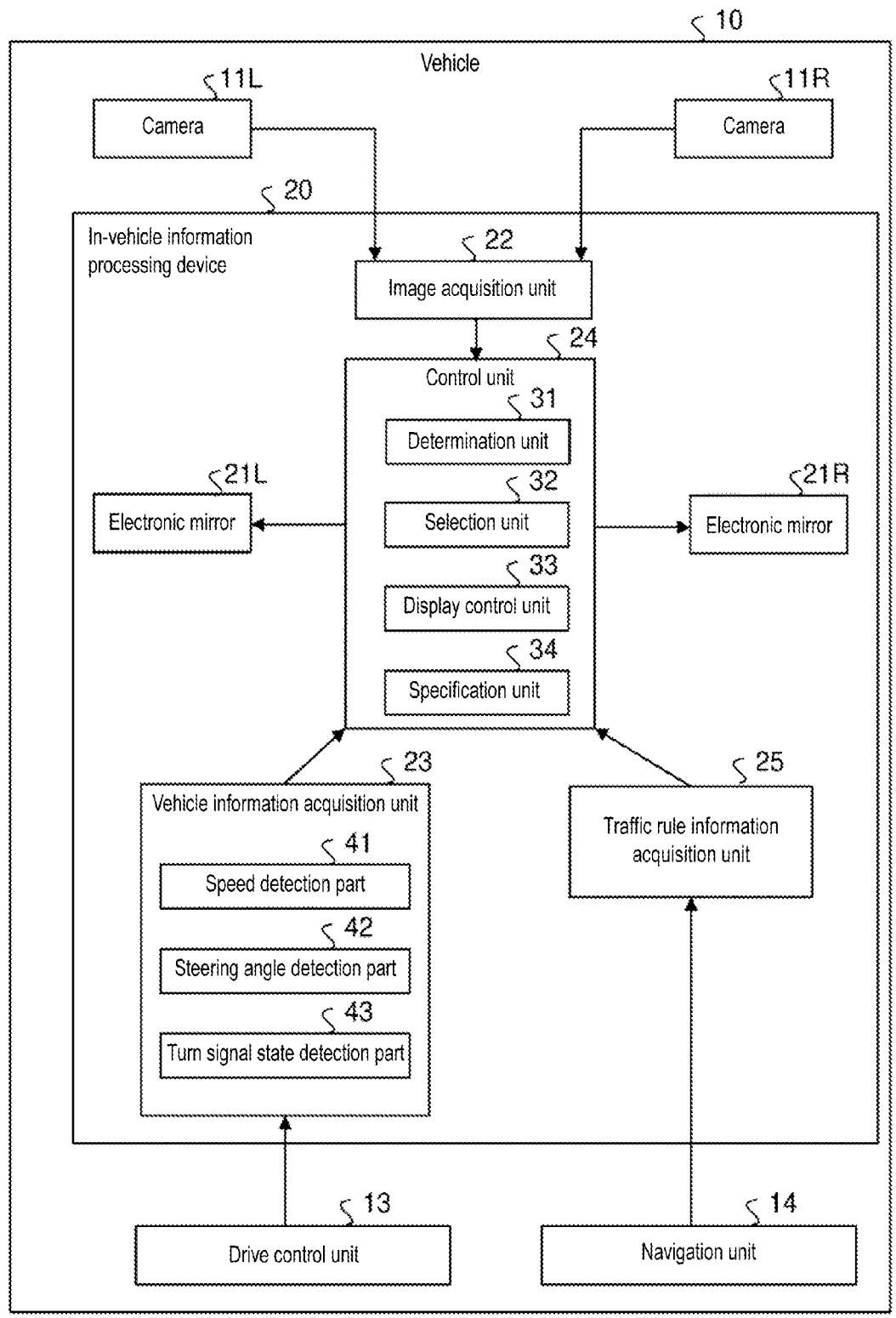
FIG. 3 is a configuration diagram of an in-vehicle information processing device.

FIG. 3 is a configuration diagram illustrating an example configuration of the in-vehicle information processing device 20. The in-vehicle information processing device 20 is connected to the camera 11L, the camera 11R, a drive control unit 13, a navigation unit 14, and the like. The drive control unit 13 is a group of units which controls the acceleration/deceleration and steering of the vehicle. The navigation unit 14 is a unit that specifies the position of the vehicle 10 and searches and guides the route of the vehicle with reference to a map database. The navigation unit 14 can provide the in-vehicle information processing device 20 with traffic rules around the vehicle 10.

The in-vehicle information processing device 20 includes the electronic mirror 21, an image acquisition unit 22, a vehicle information acquisition unit 23, a control unit 24, and a traffic rule information acquisition unit 25. The control unit 24 is, for example, a central processing unit (CPU), and implements functions as a determination unit 31, a selection unit 32, a display control unit 33, and a specification unit 34.

The camera 11R photographs a right rear of the vehicle 10. The camera 11L photographs a left rear of the vehicle 10. The electronic mirror 21 includes the electronic mirror 21R and the electronic mirror 21L. The electronic mirror 21R is a display that displays an image of the right rear of the vehicle 10. The electronic mirror 21R is disposed in the right front pillar, for example. The electronic mirror 21L is a display that displays an image of the left rear of the vehicle 10. The electronic mirror 21L is disposed in the left front pillar, for example.

The image acquisition unit 22 acquires and outputs, to the control unit 24, an image of the rear side of the vehicle 10 photographed by the camera 11L and the camera 11R.

The vehicle information acquisition unit 23 acquires information indicating a state of the vehicle 10. The vehicle information acquisition unit 23 includes a speed detection part 41, a steering angle detection part 42, and a turn signal state detection part 43. The speed detection part 41 detects the traveling speed of the vehicle 10. For example, speedometer values may be acquired. The steering angle detection part 42 detects the steering angle of the vehicle 10. The steering angle may be acquired from, for example, a steering control unit. The steering angle detection part 42 may acquire the angle of the tire. The turn signal state detection part 43 detects the state of the turn signal (turn signal lamp). The information acquired by the vehicle information acquisition unit 23 includes information regarding the operation of turning the vehicle 10 (steering angle and turn signal lamp state).

The traffic rule information acquisition unit 25 acquires information regarding a traffic rule of the road on which the vehicle 10 travels. As an example, the traffic rule information acquisition unit 25 acquires, from the navigation unit 14, the position of the vehicle 10, a road to travel, the road, and the traffic rules of the road. The traffic rule may be acquired by photographing the surroundings of the vehicle 10 with the camera and performing image processing on the photographing result to recognize a sign or the like. Examples of the traffic rules include right turn prohibition, left turn prohibition, deviation prohibition, overtaking prohibition, lane change prohibition, and parking and stopping prohibition.

The determination unit 31 determines whether the steering has been operated based on the information acquired by the vehicle information acquisition unit 23. For example, it is determined whether the steering has been operated to an angle larger than a predetermined angle. The predetermined angle may be any angle, as long as the vehicle can turn right or left or change lanes. It is determined whether the turn signal has been operated based on the information acquired by the vehicle information acquisition unit 23. For example, it is determined whether the turn signal has been operated based on ON/OFF of the turn signal lamp acquired by the vehicle information acquisition unit 23. The determination unit 31 determines whether the operation by the driver violates a traffic rule based on the information acquired by the vehicle information acquisition unit 23 and a direction specified by the specification unit 34 described later. In other words, the determination unit 31 determines whether the direction of the operation by the driver violates a traffic rule.

The selection unit 32 selects the electronic mirror 21 in the direction corresponding to the operation of the driver from the plurality of electronic mirrors 21. For example, when the direction of the operation of turning the vehicle is a direction violating the traffic rule specified by the specification unit 34 described later, either the left electronic mirror 21L or the right electronic mirror 21R is selected as the electronic mirror corresponding to the direction of the operation of turning the vehicle.

The display control unit 33 causes the electronic mirror 21L to always display an image photographed by the camera 11L, thereby causing the electronic mirror 21L to function as a left-side door mirror. The display control unit 33 causes the electronic mirror 21R to display an image photographed by the camera 11R, thereby causing the electronic mirror 21R to function as a right-side door mirror.

When the direction of the driver's operation is a direction violating the traffic rule, the display control unit 33 displays, on the electronic mirror 21, the image photographed by the camera 11 on which information regarding the traffic rule is temporarily superimposed. The display control unit 33 displays the information on the traffic rule on the electronic mirror 21 selected by the selection unit 32.

Based on the traffic rule acquired by the traffic rule information acquisition unit 25, the specification unit 34 specifies whether the direction violating the traffic rules is the right direction or the left direction of the vehicle 10. If the acquired traffic rule is right turn prohibition, the specification unit 34 specifies that the direction violating the traffic rule is right. If the acquired traffic rule is left turn prohibition, the specification unit 34 specifies that the direction violating the traffic rule is left. If the acquired traffic rule is deviation prohibition and the line indicating the deviation prohibition is drawn on the road surface on the right side, the specification unit 34 specifies that the direction violating the traffic rule is right. If the acquired traffic rule is deviation prohibition and the line indicating the deviation prohibition is drawn on the road surface on the left side, the specification unit 34 specifies that the direction violating the traffic rule is left. The same applies to a case where the acquired traffic rule is overtaking prohibition and lane change prohibition. If the acquired traffic rule is parking and stopping prohibition and a sign indicating parking and stopping prohibition is present on the right side of the vehicle, the specification unit 34 specifies that the direction violating the traffic rule is right. If the acquired traffic rule is parking and stopping prohibition and a sign indicating parking and stopping prohibition is present on the left side of the vehicle, the specification unit 34 specifies that the direction violating the traffic rule is left. The specification unit 34 saves the specified direction into a storage unit not illustrated in association with the traffic rules.

Violation and display will be described with a specific example. When the operation of turning the vehicle 10 violates a traffic rule, the display control unit 33 displays information regarding the traffic rule on the electronic mirror corresponding to the direction of the operation of turning the vehicle 10. That is, when the direction of the operation of turning the vehicle 10 is the direction violating the traffic rule, the information regarding the traffic rule is displayed onto the electronic mirror corresponding to the direction of the operation of turning the vehicle 10.

As an example, the traffic rule is right turn prohibition and/or left turn prohibition. When the driver's operation of moving the vehicle 10 violates the traffic rule of right turn prohibition and/or left turn prohibition, the display control unit 33 displays information regarding the traffic rule (right turn prohibition and/or left turn prohibition) on either the right electronic mirror 21R or the left electronic mirror 21L selected by the selection unit 32.

For example, on a road where right turn is prohibited, the traffic rule information acquisition unit 25 stores that the direction violating the traffic rule is the right direction of the vehicle 10. The determination unit 31 determines that the driver's operation of turning the vehicle 10 to the right violates the traffic rule of right turn prohibition. In this case, the selection unit 32 selects the right electronic mirror 21R. This is because the driver is about to turn the vehicle 10 to the right direction on a road where right turn is prohibited.

For example, on a road where left turn is prohibited, the traffic rule information acquisition unit 25 stores that the direction violating the traffic rule is the left direction of the vehicle 10. The determination unit 31 determines that the driver's operation of turning the vehicle 10 to the left violates the traffic rule of left turn prohibition. In this case, the selection unit 32 selects the left electronic mirror 21L. This is because the driver is about to turn the vehicle 10 to the left direction on a road where left turn is prohibited.

As an example, the traffic rule is deviation prohibition. When the driver's operation of turning the vehicle 10 violates the traffic rule of deviation prohibition, the display control unit 33 displays information regarding the traffic rule (deviation prohibition) on either the right electronic mirror 21R or the left electronic mirror 21L selected by the selection unit 32. For example, when the line on the road surface indicating deviation prohibition is drawn on the right side of the vehicle, the traffic rule information acquisition unit 25 stores that the direction violating the traffic rule is the right direction of the vehicle 10. The determination unit 31 determines that the driver's operation of turning the vehicle 10 to the right violates the traffic rule of deviation prohibition. In this case, the selection unit 32 selects the right electronic mirror 21R.

For example, when the line on the road surface indicating deviation prohibition is drawn on the left side of the vehicle, the traffic rule information acquisition unit 25 stores that the direction violating the traffic rule is the left direction of the vehicle 10. The determination unit 31 determines that the driver's operation of turning the vehicle 10 to the left violates the traffic rule of deviation prohibition. In this case, the selection unit 32 selects the left electronic mirror 21L.

When predicting that the vehicle 10 violates the speed regulation by acceleration for overtaking another vehicle, the display control unit 33 displays information regarding the traffic rules (legal speed or speed limit) onto the electronic mirror 21 selected by the selection unit 32.

As an example, the traffic rule is lane change prohibition. When the direction of the driver's operation of turning the vehicle 10 is the direction violating the traffic rule of lane change prohibition, the display control unit 33 displays information regarding the traffic rule (lane change prohibition) on either the right electronic mirror 21R or the left electronic mirror 21L selected by the selection unit 32. For example, when the line indicating lane change prohibition is drawn on the road surface on the right side of the vehicle, the traffic rule information acquisition unit 25 stores that the direction violating the traffic rule is the right direction of the vehicle 10. The determination unit 31 determines that the driver's operation of turning the vehicle 10 to the right violates the traffic rule of deviation prohibition. In this case, the selection unit 32 selects the right electronic mirror 21R.

For example, when the line indicating lane change prohibition is drawn on the road surface on the left side of the vehicle, the traffic rule information acquisition unit 25 stores that the direction violating the traffic rule is the left direction of the vehicle 10. The determination unit 31 determines that the driver's operation of turning the vehicle 10 to the left violates the traffic rule of deviation prohibition. In this case, the selection unit 32 selects the left electronic mirror 21L.

As an example, the traffic rule is parking and stopping prohibition. When the driver's operation of moving the vehicle 10 near the edge of the road violates the traffic rule of parking and stopping prohibition, the display control unit 33 displays information regarding the traffic rule (parking and stopping prohibition) on either the right electronic mirror 21R or the left electronic mirror 21L selected by the selection unit 32.

For example, when the sign indicating parking and stopping prohibition is present on the right side of the vehicle, the traffic rule information acquisition unit 25 stores that the direction violating the traffic rule is the right direction of the vehicle 10. The determination unit 31 determines that the driver's operation of turning the vehicle 10 to the right violates the traffic rule of parking and stopping prohibition. The selection unit 32 selects the right electronic mirror 21R.

For example, when the sign indicating parking and stopping prohibition is present on the left side of the vehicle, the traffic rule information acquisition unit 25 stores that the direction violating the traffic rule is the left direction of the vehicle 10. The determination unit 31 determines that the driver's operation of turning the vehicle 10 to the left violates the traffic rule of parking and stopping prohibition. The selection unit 32 selects the left electronic mirror 21L.

Figure 4:
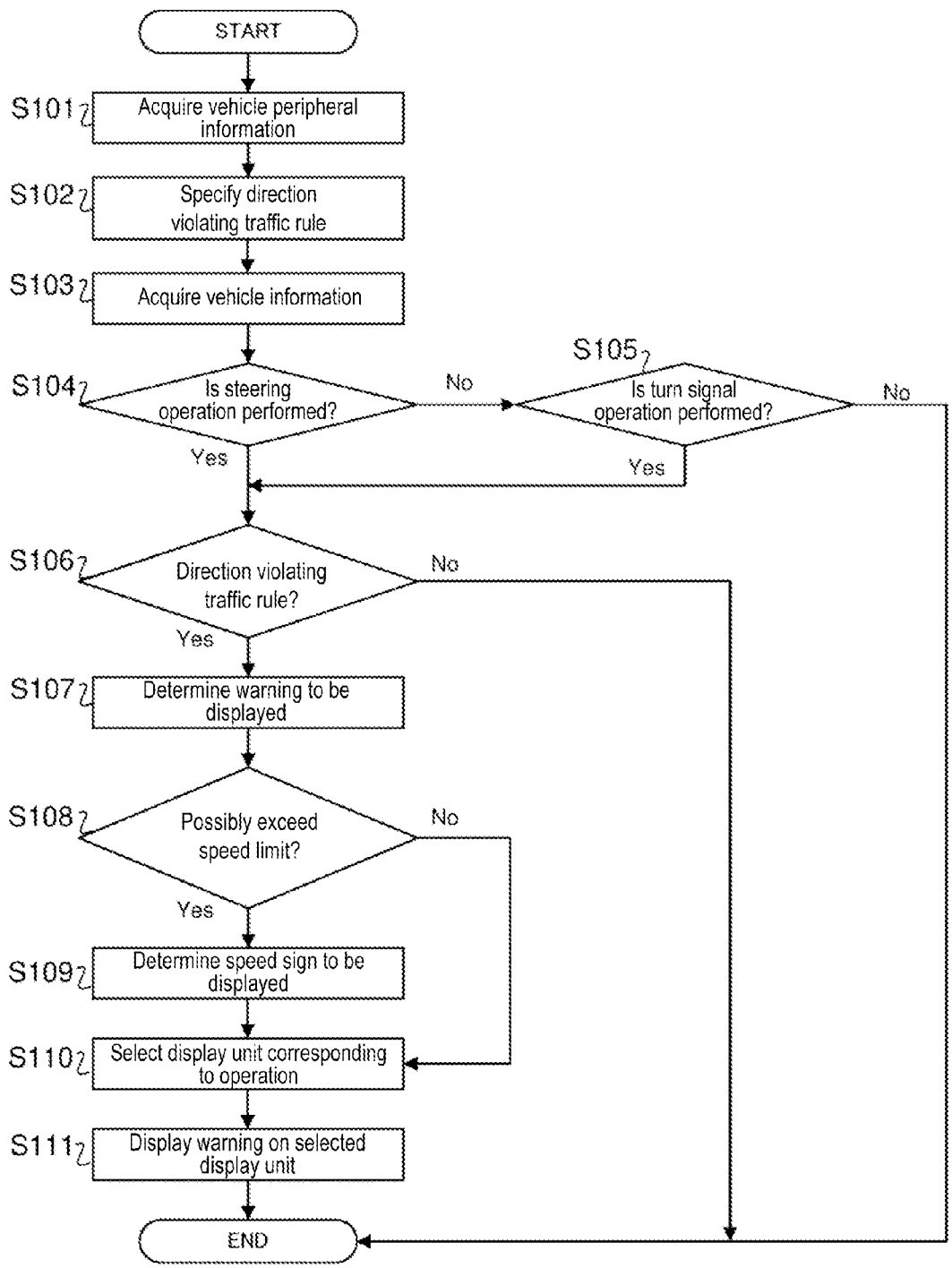
FIG. 4 is a flowchart of information provision of a traffic rule.

FIG. 4 is a flowchart of information provision of a traffic rule. The in-vehicle information processing device 20 repeatedly executes the processing of the following steps S101 to S111.

Step S101: The traffic rule information acquisition unit 25 acquires position information of the vehicle 10, an image obtained by photographing the surroundings of the vehicle 10, and the like, and acquires information regarding the surroundings of the vehicle 10. For example, the traffic rule information acquisition unit 25 acquires the traffic rules from the navigation unit 14. For example, the traffic rule information acquisition unit 25 recognizes a sign, a section line, characters printed on the road surface, or the like indicating a deviation prohibition section from an image of the road on which the vehicle 10 is traveling. Thereafter, the process proceeds to step S102.

Step S102: With reference to the traffic rule around the vehicle based on the information acquired in step S101, the specification unit 34 specifies whether the direction violating the traffic rule is the right direction or the left direction of the vehicle 10. Thereafter, the process proceeds to step S103.

Step S103: The vehicle information acquisition unit 23 acquires information regarding steering operation and turn signal operation from various sensors. Thereafter, the process proceeds to step S104.

Step S104: The determination unit 31 determines whether the steering has been operated to an angle larger than a predetermined value based on the information acquired in step S103. The process proceeds to step S106 if Yes, and the process proceeds to step S105 if No.

Step S105: The determination unit 31 determines whether the turn signal has been operated based on the information acquired in step S103. If the turn signal has not been operated, the process ends. That is, even if there is a traffic rule on the road where the vehicle travels, no warning is displayed unless the driver performs an operation violating the rule. Therefore, power consumption of the display can be suppressed. The process proceeds to step S106 if the turn signal has been operated.

Step S106: The determination unit 31 reads the direction violating the traffic rule specified in step S102, and determines whether the direction where the steering or the turn signal has been operated is the direction violating the traffic rule. If the determination result is No, the process ends. The process proceeds to step S107 if the determination result is Yes.

Step S107: The display control unit 33 determines a warning to be displayed according to the corresponding violation. Thereafter, the process proceeds to step S108.

Step S108: The determination unit 31 determines whether the vehicle 10 possibly exceeds the speed limit or the legal speed from the vehicle information acquired in step S103. The process proceeds to step S109 if the determination result is Yes. The process proceeds to step S110 if the determination result is No.

Step S109: The display control unit 33 determines a warning for displaying the current speed condition (speed limit or legal speed). Thereafter, the process proceeds to step S110.

Step S110: The selection unit 32 selects the electronic mirror 21 existing in the direction corresponding to the steering or the turn signal operation. Thereafter, the process proceeds to step S111.

Step S111: The display control unit 33 displays a warning on the electronic mirror 21 selected in steps S107 and S109.

FIG. 5 is an example of providing the driver with information on a traffic rule. In FIG. 5, traffic rules "deviation prohibition section", "lane change prohibition section", "entry prohibition", "right turn prohibition", "left turn prohibition", "U-turn prohibition", "overspeed", and "parking and stopping prohibition" are exemplified, but the traffic rules are not limited to them, and information on any traffic rules can be provided.

When the traffic rule is "deviation prohibition section" and the operation "turn signal ON" in the direction where the deviation prohibition section exists is detected, the display control unit 33 displays a warning indicating "deviation prohibition section" on the electronic mirror 21 in the direction where the turn signal has been operated.

When the traffic rule is "deviation prohibition section" and the operation "steering operation" in the direction where the deviation prohibition section exists is detected, the display control unit 33 displays a warning indicating "deviation prohibition section" on the electronic mirror 21 in the direction where the turn signal has been operated.

When the traffic rule is "lane change prohibition section" and the operation "turn signal ON" is detected, the display control unit 33 displays a warning indicating "lane change prohibition section" on the electronic mirror 21 in the direction where the turn signal has been operated.

When the traffic rule is "lane change prohibition section" and the operation "steering operation" is detected, the display control unit 33 displays a warning indicating "lane change prohibition section" on the electronic mirror 21 in the direction where the turn signal has been operated.

When the traffic rule is "entry prohibition" and the operation "turn signal ON" is detected, the display control unit 33 displays a warning indicating "entry prohibition" on the electronic mirror 21 in the direction where the turn signal has been operated.

When the traffic rule is "entry prohibition" and the operation "steering operation" is detected, the display control unit 33 displays a warning indicating "entry prohibition" on the electronic mirror 21 in the direction where the turn signal has been operated.

When the traffic rule is "right turn prohibition" and the operation "turn signal ON" is detected, the display control unit 33 displays a warning indicating "right turn prohibition" on the electronic mirror 21 in the direction where the turn signal has been operated. The same applies to a case where the traffic rule is left turn prohibition.

When the traffic rules are "right turn prohibition" and the operation "steering operation" is detected, the display control unit 33 displays a warning indicating "right turn prohibition" on the electronic mirror 21 in the direction where the turn signal has been operated. The same applies to a case where the traffic rule is left turn prohibition.

When the traffic rule is "U-turn prohibition" and the operation "turn signal ON" is detected, the display control unit 33 displays a warning indicating "U-turn prohibition" on the electronic mirror 21 in the direction where the turn signal has been operated.

When the traffic rule is "U-turn prohibition" and the operation "steering operation" is detected, the display control unit 33 displays a warning indicating "U-turn prohibition" on the electronic mirror 21 in the direction where the turn signal has been operated.

When the traffic rule is "overspeed" and the operation "near the speed upper limit+turn signal ON" is detected, the display control unit 33 displays a warning indicating "speed upper limit" on the electronic mirror 21 in the direction where the turn signal has been operated. The speed upper limit is a speed limit if the speed limit is set, and is a legal speed if the speed limit is not set. This is because the turn signal operation suggests that the vehicle 10 overtakes another vehicle, and the vehicle 10 accelerates to overtake the other vehicle, thereby predicting overspeed.

When the traffic rule is "parking and stopping prohibition" and the operation "sidewalk side turn signal ON" is detected, the display control unit 33 displays a warning indicating "parking and stopping prohibition" on the electronic mirror 21 in the direction where the turn signal has been operated. This warning triggered by turning on the turn signal on the sidewalk side is displayed on the electronic mirror 21 on the sidewalk side because electronic mirror 21 on the sidewalk side is selected by the selection unit 32. This is because, even on the passenger's seat side far from the driver, the driver highly possibly checks the electronic mirror 21 on the passenger's seat side when moving the vehicle near the sidewalk on the passenger's seat side to park and stop the vehicle.

As described above, the in-vehicle information processing device 20 of the disclosure includes: the traffic rule information acquisition unit 25 that acquires information regarding a traffic rule of a road on which the vehicle 10 travels; the vehicle information acquisition unit 23 that acquires information regarding an operation of turning the vehicle 10; the determination unit 31 that determines whether the operation violates the traffic rule; the selection unit 32 that selects an the electronic mirror 21 in a direction corresponding to the operation from a plurality of electronic mirrors 21; and the display control unit 33 that performs control to display the information regarding the traffic rule on the electronic mirror 21, in which when the operation violates the traffic rule, the display control unit 33 performs control to display the information regarding the traffic rule on the selected electronic mirror 21.

Therefore, the in-vehicle information processing device 20 can efficiently provide information regarding traffic rules and suppress traffic rule violation. This is because by displaying the traffic rule on the electronic mirror to be checked when the driver performs an operation of violating the traffic rule, the driver is effectively notified that the operation is an act of violating the traffic rule. Since it is not necessary to detect the line of sight for specifying the electronic mirror seen by the driver or to use a plurality of electronic mirrors for guiding the line of sight of the driver, power consumption can be suppressed.

The in-vehicle information processing device 20 includes the specification unit 34 that specifies a direction violating a traffic rule based on information regarding the traffic rule, and when the direction of an operation of turning the vehicle 10 is the direction violating the traffic rule, the selection unit 32 selects the left electronic mirror provided on the left side of the vehicle or the right electronic mirror provided on the right side of the vehicle as the electronic mirror 21 corresponding to the direction of the operation of turning the vehicle 10. Therefore, it is possible to efficiently suppress left and right turning that violates the traffic rule.

The traffic rule is right turn prohibition and/or left turn prohibition, and the selection unit 32 selects the right electronic mirror 21R when the operation of turning the vehicle 10 in the right direction violates the traffic rule of right turn prohibition, and selects the left electronic mirror 21L when the operation of turning the vehicle in the left direction violates the traffic rule of left turn prohibition. Therefore, information display is performed onto the electronic mirror 21 that is highly likely to be checked by the driver, and traffic rule violation is efficiently suppressed.

The selection unit 32 selects the electronic mirror 21 in the direction corresponding to the operation when the operation violates the traffic rule of deviation prohibition. Therefore, it is possible to efficiently suppress the violation regarding overtaking and overspeed.

The traffic rule is lane change prohibition, and the selection unit 32 selects the right electronic mirror 21R when the operation of moving the vehicle 10 to the right lane violates the traffic rule of lane change prohibition, and selects the left electronic mirror 21L when the operation of moving the vehicle 10 to the left lane violates the traffic rule of lane change prohibition. Therefore, it is possible to efficiently prevent the violation regarding lane change.

The traffic rule is parking and stopping prohibition, and the selection unit 32 selects the electronic mirror 21 corresponding to the direction of the operation of moving the vehicle to the edge of the road when the operation of moving the vehicle 10 to the edge of the road violates the traffic rule of parking and stopping prohibition. Therefore, it is possible to efficiently prevent the violation regarding parking and stopping prohibition.

The image acquisition unit 22 that acquires an image of a rear side of the vehicle 10 is further included, and the display control unit 33 always displays the image on the electronic mirror 21, and, when the operation violates the traffic rule, displays, on the electronic mirror 21, the image on which information regarding the traffic rule is temporarily superimposed. Therefore, it is possible to suppress efficiency rule violation while securing the function as the electronic mirror 21.

At least any of information on a steering operation and information on a turn signal lamp operation is acquired as information regarding the operation of turning the vehicle. This makes it possible to reliably detect the operation of turning the vehicle 10 left and right and to suppress the violation regarding left and right turning.

Note that the present invention is not limited to the abovementioned examples and includes various modified examples. The above-described examples have been described in detail in order to describe the present invention in an easy-to-understand manner, and are not necessarily limited to those having all the described configurations. Any of these configurations may be deleted, or any configuration may be added or replaced. For example, any method such as an image of a sign, a word, a sentence, or highlighting of an element in an image can be used for warning and information provision. When an image of a sign or the like is superimposed, it is preferable to display it at a position where important information in an image photographed by the camera 11 is not impaired. For example, a vehicle body part of the own vehicle, a part other than the road surface, an outside of a range where display is mandatory, and the like in the photographed image may be used.

The in-vehicle information processing device 20 does not need to include the electronic mirror 21. For example, the electronic mirror 21 may be connected to the in-vehicle information processing device 20, and the display control unit 33 may control the electronic mirror 21.

The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

DESCRIPTION OF REFERENCE NUMERALS

10: vehicle, 11: camera, 13: drive control unit, navigation unit, 20: in-vehicle information processing device, 21: electronic mirror, 22: image acquisition unit, 23: vehicle information acquisition unit, 24: control unit, 25: traffic rule information acquisition unit, 31: determination unit, 32: selection unit, 33: display control unit, 34: specification unit, 41: speed detection part, 42: steering angle detection part, 43: turn signal state detection part

The invention claimed is:

1. An in-vehicle information processing device, comprising:
   a traffic rule information acquisition unit that acquires information regarding a traffic rule of a road on which a vehicle travels;
   a vehicle information acquisition unit that acquires information regarding an operation of turning the vehicle;
   a determination unit that determines whether the operation violates the traffic rule;
   a selection unit that selects an electronic mirror in a direction corresponding to the operation from a plurality of electronic mirrors; and
   a display control unit that performs control to display the information regarding the traffic rule on the electronic mirror,
   wherein when the operation violates the traffic rule, the display control unit performs control to display the information regarding the traffic rule on the selected electronic mirror.

2. The in-vehicle information processing device according to claim 1, further comprising:
   a specification unit that specifies a direction violating the traffic rule based on the information regarding the traffic rule, wherein
   when a direction of the operation of turning the vehicle is a direction violating the traffic rule, the selection unit selects a left electronic mirror provided on a left side of the vehicle or a right electronic mirror provided on a right side of the vehicle as an electronic mirror corresponding to the direction of the operation of turning the vehicle.

3. The in-vehicle information processing device according to claim 2, wherein the traffic rule is a right turn prohibition and/or a left turn prohibition, and the selection unit selects the right electronic mirror when an operation of turning the vehicle in a right direction violates a traffic rule of right turn prohibition, and selects the left electronic mirror when an operation of turning the vehicle in a left direction violates a traffic rule of left turn prohibition.

4. The in-vehicle information processing device according to claim 1, wherein the selection unit selects the electronic mirror in a direction corresponding to the operation when the operation violates a traffic rule of deviation prohibition.

5. The in-vehicle information processing device according to claim 2, wherein the traffic rule is a lane change prohibition, and the selection unit selects the right electronic mirror when an operation of moving the vehicle to a right lane violates the traffic rule of lane change prohibition, and selects the left electronic mirror when an operation of moving the vehicle to a left lane violates the traffic rule of lane change prohibition.

6. The in-vehicle information processing device according to claim 1, wherein the traffic rule is a parking and stopping prohibition, and the selection unit selects the electronic mirror corresponding to a direction of an operation of moving the vehicle to an edge of a road when the operation of moving the vehicle to the edge of the road violates the traffic rule of parking and stopping prohibition.

7. The in-vehicle information processing device according to claim 1, further comprising:
   an image acquisition unit that acquires an image obtained by photographing a rear side of the vehicle, wherein
   the display control unit always displays the image on the electronic mirror, and, when the operation violates the traffic rule, displays, on the electronic mirror, the image on which information regarding the traffic rule is temporarily superimposed.

8. The in-vehicle information processing device according to claim 1, wherein at least some information on a steering operation and information on a turn signal lamp operation is acquired as information regarding the operation of turning the vehicle.

* * * * *